United States Patent Office 3,712,943
Patented Jan. 23, 1973

3,712,943
INSECTICIDALLY, ACARICIDALLY AND RODENT-
ICIDALLY ACTIVE 9-SUBSTITUTED ACRIDINES
Dietmar Mayer, Leverkusen, Klaus Sasse, Schildgen, and Gunther Hermann, Leverkusen, Germany, assignors to Farbenfabriken Bayer Aktiengesellschaft, Leverkusen, Germany
No Drawing. Filed Nov. 24, 1969, Ser. No. 879,611
Claims priority, application Germany, Nov. 28, 1968,
P 18 11 409.5
Int. Cl. A01n 17/14, 9/22
U.S. Cl. 424—84                    8 Claims

ABSTRACT OF THE DISCLOSURE

Compositions and methods of using certain 9-substituted-acridines, i.e., 1,2,3 and 4-(optionally alkyl and chloro)-9-[1'-(optionally alkyl and hydroxy-alkyl)-2'-mono- and 2',2'-di(optionally alkyl, chloroalkyl, alkyl-carbonyl, cyanoalkyl-carbonyl, phenyl-alkyl-carbonyl, phenoxy-alkyl-carbonyl, cycloalkyl-carbonyl, alkoxy-carbonyl, phenyl-carbonyl, chlorophenyl-carbonyl, alkyl-phenyl-carbonyl, alkoxy-phenyl-carbonyl, nitro-phenyl-carbonyl, furyl-carbonyl, pyridyl-carbonyl and alkyl-phenyl-sulfonyl) as well as 2'-(alkylidene and phenyl-alkylidene)-hydrazino]-acridines; 1,2,3 and 4-(optionally alkyl and chloro)-9-[N-(optionally alkyl and hydroxy-alkyl)-N-(piperidino and morpholino)-amino]-acridines; 1,2,3 and 4-(optionally alkyl and chloro)-9-[3'-(optionally alkyl and hydroxy-alkyl)-4'-mono- and 4',4'-di-(optionally alkyl, chloroalkyl, alkyl-carbonyl, cyanoalkyl-carbonyl, phenyl-alkyl-carbonyl, phenoxy-alkyl-carbonyl, cycloalkyl-carbonyl, alkoxy-carbonyl, phenyl-carbonyl, chloro-phenyl-carbonyl, alkyl-phenyl-carbonyl, alkoxy-phenyl-carbonyl, nitro-phenyl-carbonyl, furyl-carbonyl, pyridyl-carbonyl and alkyl-phenyl-sulfonyl) as well as 4'-(alkylidene and phenyl-alkylidene)-thiosemi carbazido]-acridines; 1,2,3 and 4-(optionally alkyl and chloro)-9-[3'-(optionally alkyl and hydroxy-alkyl)-3'-(piperidino and morpholino)-thioureido]-acridines; and the corresponding hydrogen chloride and alkyl-sulfuric acid salts; some of which are known, which possess strong insecticidal, acaricidal and rodenticidal properties.

---

The present invention relates to and has for its objects the provision for particular new active compositions in the form of mixtures with solid and liquid dispersible carrier vehicles of certain 9-substituted-acridines, i.e., 1,2,3 and 4-(optionally alkyl and chloro)-9-[1'-(optionally alkyl and hydroxy-alkyl)-2'-mono- and 2',2'-di-(optionally alkyl, chloroalkyl, alkyl-carbonyl, cyanoalkyl-carbonyl, phenyl-alkyl-carbonyl, phenoxy-alkyl-carbonyl, cyclo-alkyl-carbonyl, alkoxy-carbonyl, phenyl-carbonyl, chloro-phenyl-carbonyl, alkyl-phenyl-carbonyl, alkoxy-phenyl-carbonyl, nitro-phenyl-carbonyl, furyl-carbonyl, pyridyl-carbonyl and alkyl-phenyl-sulfonyl) as well as 2'-(alkylidene and phenyl-alkylidene)-hydazino]-acridines; 1,2,3 and 4-(optionally alkyl and chloro)-9-[N-optionally alkyl and hydroxy-alkyl)-N-(piperidino and morpholino)-amino]-acridines; 1,2,3 and 4-(optionally alkyl and chloro)-9-[3'-(optionally alkyl and hydroxy-alkyl)-4'-mono- and 4',4'-di(optionally alkyl, chloro-alkyl, alkyl-carbonyl, cyanoalkyl-carbonyl, phenyl-alkyl-carbonyl, phenoxy-alkyl-carbonyl, cycloalkyl-carbonyl, alkoxy-carbonyl, phenyl-carbonyl, chloro-phenyl-carbonyl, alkyl-phenyl-carbonyl, alkoxy-phenyl-carbonyl, nitro-phenyl-carbonyl, furyl-carbonyl, pyridyl-carbonyl- and alkyl-phenyl-sulfonyl) as well as 4'-(alkylidene and phenyl-alkylidene)-thiosemicarbazido]-acridines; 1,2,3 and 4-(optionally alkyl and chloro)-9-[3'(optionally alkyl and hydroxyalkyl)-3'-(piperidino and morpholino)-thioureido]-acridines; and the corresponding hydrogen chloride and alkyl-sulfuric acid salts; some of which are known, and which possess valuable strong arthropodicidal, especially insecticidal and acaricidal, as well as rodenticidal, properties, and methods for using such compounds in a new way, especially for combating and controlling arthropods, e.g., insects and acarids, as well as rodents, with other and further objects becoming apparent from a study of the within specification and accompanying examples.

It is known that heterocyclic compounds can be used for the control of insects and mites, for example 1-isopropyl-3-methyl-pyrazol-5-yl-N,N-dimethyl-carbamate (A) (see Swiss Pat. 282,655). It is also known that $\alpha$-naphthyl-N-methyl-carbamate (B) is usable in like manner.

Furthermore, it is known to use, for the control of destructive rodents, rodenticides such as zinc phosphide (C), alpha-naphthyl-thiourea (D) and 5-($\alpha$-hydroxy-$\alpha$-pyrid-2'-yl-benzyl)-7-($\alpha$-pyrid-2''-yl-benzylidene)-5-norbornene-2,3-dicarboximide (E). These known active compounds are of considerable importance in practice.

It has now been found, in accordance with the present invention, that certain 9-substituted acridines, some of which are known, of the formula

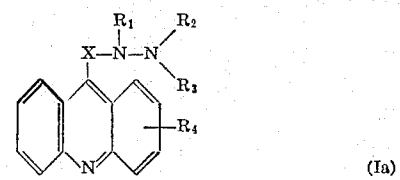

(Ia)

in which

X is a direct bond or the —NH—CS—group, $R_1$ is hydrogen, alkyl of 1–4 carbon atoms or hydroxy-alkyl of 1–4 carbon atoms, $R_2$ and $R_3$ each individually is hydrogen, alkyl or 1–4 carbon atoms, chloro-alkyl of 1–4 carbon atoms, alkyl-carbonyl of 1–18 carbon atoms, cyano-alkyl-carbonyl having 2–5 carbon atoms in the alkyl-carbonyl moiety, phenyl-alkyl-carbonyl having 2–3 carbon atoms in the alkyl-carbonyl moiety, phenoxy-alkyl-carbonyl having 2–3 carbon atoms in the alkyl-carbonyl moiety, cyclo-alkyl-carbonyl having 5–6 ring carbon atoms in the cycloalkyl moiety, alkoxy-carbonyl having 2–5 carbon atoms, phenyl-carbonyl, chloro-phenyl-carbonyl, alkyl-phenyl-carbonyl having 1–4 carbon atoms in the alkyl moiety, alkoxy-phenyl-carbonyl having 1–4 carbon atoms in the alkoxy moiety, nitro-phenyl-carbonyl, furyl-carbonyl, pyridyl-carbonyl and alkyl-phenyl-sulfonyl having 1–4 carbon atoms in the alkyl moiety,
  with the proviso that $R_2$ and $R_3$ when taken together form alkylidene of 1–4 carbon atoms or phenyl-alkylidene having 1–4 carbon atoms in the alkylidene moiety, and
  with the further proviso that $R_2$ and $R_3$ when taken together with the adjacent N-atom form piperidino or morpholino, and $R_4$ is hydrogen, alkyl of 1–4 carbon atoms or chloro, and the corresponding hydrogen chloride salt and alkylsulfuric acid salts having 1–4 carbon atoms in the alkyl moiety, exhibit strong arthropodicidal, especially insecticidal and acaricidal, as well as rodenticidal, properties.

It is very surprising that the particular active compounds of Formula Ia above usable according to the present invention exhibit a higher insecticidal and acaricidal potency than the corresponding previously known compounds having the same type activity such as compounds (A) and (B) mentioned above. It is also very surprising that such compounds of Formula Ia above usable according to the present invention exhibit stronger rodenticidal properties than the corresponding previously known compounds having the same type activity such as compounds (C), (D) and (E) mentioned above. The use of the instant active compounds according to the present invention therefore represents a valuable contribution to the art.

A number of active compounds usable according to the present invention are already known (cf. C.A. 62, 517 (1965), J. Chem. Soc. 1965, 4653) but there has been no appreciation heretofore of the pest-control properties of such compounds.

The other generically known active compounds are specifically new, but they can be prepared in a simple manner according to known processes.

The particular compounds of Formula Ia above, in which X represents a direct bond, can be prepared by the process which comprises reacting a 9-chloro-acridine of the formula

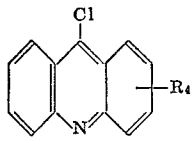

(II)

in which $R_4$ is the same as defined above, with a hydrazine compound of the formula

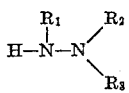

(III)

in which $R_1$, $R_2$ and $R_3$ are the same as defined above, in excess phenol as reaction medium at a temperature of substantially between about 80–120° C. From the reaction mixture the product of Formula Ia above can be precipitated in the form of the hydrochloride with ether.

The particular compounds of Formula Ia above, in which X represents the grouping —NH—CS— can be obtained by the process which comprises reacting acridin-9-yl-isothiocyanate of the formula

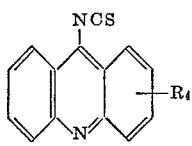

(IV)

in which $R_4$ is the same as defined above; with a hydrazine compound of Formula III above in an inert solvent, for example ethanol or benzene.

Advantageously, in accordance with the present invention, in the various formulae herein:

X represents
a direct bond; or the —NH—CS— group;

$R_1$ represents
hydrogen;
straight and branched chain lower alkyl hydrocarbon of 1–4 carbon atoms such as methyl, ethyl, n- and iso-propyl, n-, iso-, sec.- and tert.-butyl, and the like, especially $C_{1-3}$ or $C_{1-2}$ alkyl; or
hydroxy-substituted straight and branched chain lower alkyl of 1–4 carbon atoms such as hydroxy-substituted methyl to tert.-butyl inclusive as de-defined above, and the like, especially hydroxy-($C_{1-3}$ or $C_{1-2}$ alkyl), and more especially β-hydroxy-ethyl;

$R_2$ and $R_3$ each individually represents
hydrogen;
straight and branched chain lower alkyl hydrocarbon of 1–4 carbon atoms such as methyl to tert.-butyl inclusive as defined above, and the like, especially $C_{1-3}$ or $C_{1-2}$ alkyl;
chloro-substituted straight and branched chain lower alkyl of 1–4 carbon atoms such as chloro-substituted methyl to tert.-butyl inclusive as defined above, and the like, especially chloro-($C_{1-3}$ or $C_{1-2}$ alkyl);
straight and branched chain alkyl-carbonyl of 1–18 carbon atoms, i.e. $C_{1-18}$ alkanoyl or carbo-$C_{1-17}$ alkyl, such as aldehydo; and methyl to tert.-butyl inclusive as defined above, n- and iso-amyl, -hexyl, -heptyl, -octyl, -nonyl, -decyl, -undecyl, -dodecyl, -tridecyl, -tetradecyl, -pentadecyl, -hexadecyl, -heptadecyl, and the like, -carbonyl; i.e. methanoyl

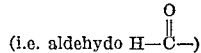

acetyl, propionyl, butanoyl, pentanoyl, hexanoyl, heptanoyl, octanoyl, nonanoyl, decanoyl, undecanoyl, dodecanoyl, tridecanoyl, tetradecanoyl, pentadecanoyl, hexadecanoyl, heptadecanoyl, octadecanoyl, and the like; especially $C_{1-4}$ or $C_{1-3}$ or $C_{1-2}$ alkyl-substituted carbonyl, and more especially acetyl, α,α-dimethyl-propionyl (i.e. tert.-butyl-carbonyl) and even stearoyl

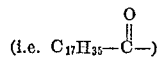

cyano-substituted straight and branched chain lower alkyl-carbonyl of 2–5 carbon atoms, i.e. cyano-substituted $C_{2-5}$ alkanoyl or cyano-substituted carbo-$C_{1-4}$ alkyl, such as cyano-substituted methyl to tert.-butyl inclusive as defined above, and the like, -carbonyl; i.e. cyano-substituted acetyl to pentanoyl inclusive as defined above, and the like; especially cyano-($C_{1-4}$ or $C_{1-3}$ or $C_{1-2}$ alkyl)-carbonyl, and more especially β-cyano-methyl-carbonyl or α-cyano-acetyl;
phenyl-alkyl-carbonyl having 1–2 carbon atoms in the alkyl moiety, i.e. phenyl-$C_{2-3}$ alkanoyl or phenyl-carbo-$C_{1-2}$ alkyl, such as benzyl, phenyl-eth-1 and 2-yl, and the like, -carbonyl; i.e. α-phenyl-acetyl, β-phenyl-propionyl, α-phenyl-propionyl, and the like; especially phenyl-$C_{1-2}$ alkyl-carbonyl, and more especially benzyl-carbonyl;
phenoxy-alkyl-carbonyl having 1–2 carbon atoms in the alkyl moiety, i.e. phenoxy-$C_{2-3}$ alkanoyl or phenoxy-carbo-$C_{1-2}$ alkyl, such as phenoxy-methyl, phenoxy-eth-1 and 2-yl, and the like, -carbonyl; i.e. α-phenoxy-acetyl, β-phenoxy-propionyl, α-phenoxy-propionyl, and the like; especially phenoxy-$C_{1-2}$ alkyl-carbonyl, and more especially phenoxy-acetyl;
cycloalkyl-carbonyl having 5–6 ring carbon atoms, i.e. $C_{5-6}$ cycloalkyl-carbonyl or carbo-$C_{5-6}$ cycloalkyl, such as cyclopentyl, cyclohexyl, and the like, -carbonyl; i.e. carbo-cyclopentyl, carbo-cyclohexyl, and the like; especially cyclohexyl-carbonyl;
alkoxy-carbonyl having 1–4 carbon atoms in the alkoxy moiety, i.e. carbo-$C_{1-4}$ alkoxy, such as methoxy, ethoxy, n- and iso-propoxy, n-, iso-, sec.- and tert.-butoxy, and the like, -carbonyl; i.e. carbomethoxy to tert.-butoxy inclusive as defined above, and the like; especially $C_{1-4}$ or $C_{1-3}$ or $C_{1-2}$ alkoxy-carbonyl;
phenyl-carbonyl, i.e. benzoyl;
chloro-phenyl-carbonyl, i.e. chloro-benzoyl, such as 2-, 3- and 4-chloro-phenyl-carbonyl, especially 4-chloro-phenyl-carbonyl;
alkyl-phenyl-carbonyl having 1–4 carbon atoms in the alkyl moiety, i.e. $C_{1-4}$ alkyl-benzoyl, such as 2-, 3- and 4-methyl to tert.-butyl inclusive as defined above, and the like, -phenyl-carbonyl, especially $C_{1-3}$ or $C_{1-2}$ alkyl-phenyl-carbonyl, and more especially 4-methyl-phenyl-carbonyl;

alkoxy-phenyl-carbonyl having 1–4 carbon atoms in the alkoxy moiety, i.e. $C_{1-4}$ alkoxy-benzoyl, such as 2-, 3- and 4-methoxy to tert.-butoxy inclusive as defined above, and the like, -phenyl-carbonyl, especially $C_{1-3}$ or $C_{1-2}$ alkoxy-phenyl-carbonyl, and more especially 2- and 4-methoxy-phenyl-carbonyl;

nitro-phenyl-carbonyl, i.e. nitro-benzoyl, such as 2-, 3- and 4-nitro-phenyl-carbonyl, especially 4-nitro-phenyl-carbonyl;

furyl-carbonyl, i.e. furoyl, such as α- and β-furyl-carbonyl, especially α-furyl-carbonyl;

pyridyl-carbonyl, i.e. carbo-pyridyl, such as pyrid-2,3 and 4-yl-carbonyl, especially pyrid-4-yl-carbonyl; and alkyl-phenyl-sulfonyl having 1–4 carbon atoms in the alkyl moiety, such as 2-, 3- and 4-methyl to tert.-butyl inclusive as defined above, and the like, -phenyl-sulfonyl, especially $C_{1-3}$ or $C_{1-2}$ alkyl-phenyl-sulfonyl, and more especially 4-methyl-phenyl-sulfonyl;

with the proviso that $R_2$ and $R_3$ when taken together represent straight and branched chain lower alkylidene hydrocarbon of 1–4 carbon atoms such as methylidene, ethylidene, n- and iso-propylidene, n-, iso- and sec.-butylidene, and the like, especially $C_{1-3}$ or $C_{1-2}$ alkylidene; or phenyl-alkylidene having 1–4 carbon atoms in the alkylidene moiety such as phenyl-methylidene, -ethylidene, -n- and -iso-propylidene, -n-, -iso- and -sec.-butylidene, and the like, especially phenyl-$C_{1-3}$ or $C_{1-2}$ alkylidene; and with the further proviso that $R_2$ and $R_3$ when taken together with the adjacent N-atom represent piperidino; or
morpholino; and $R_4$ represents hydrogen;

straight and branched chain lower alkyl hydrocarbon of 1–4 carbon atoms such as 1-, 2-, 3- and 4-nuclear position methyl to tert.-butyl inclusive as defined above, and the like, especially $C_{1-3}$ or $C_{1-2}$ alkyl, and more especially 2-methy; or chloro, such as 1-, 2-, 3- and 4-nuclear position chloro, especially 2-chloro;

such compounds including both the free base form as well as the acid salt form such as the corresponding hydrogen chloride salt, and the corresponding alkyl-sulfuric acid salts having 1–4 carbon atoms in the alkyl moiety, e.g. methyl-, ethyl-, n- and iso-propyl-, n-, iso-, sec.- and tert.-butyl, and the like, sulfuric acid salts, especially $C_{1-3}$ or $C_{1-2}$ alkyl-sulfuric acid salts, and more especially the methyl-sulfuric acid salts.

Preferably, X is a direct bond; or the —NH—CS— group; $R_1$ is hydrogen; or $C_{1-3}$ alkyl; or hydroxy-$C_{1-3}$ alkyl; $R_2$ and $R_3$ each individually is hydrogen; or $C_{1-4}$ alkyl; or chloro-$C_{1-3}$ alkyl; or $C_{1-4}$ alkyl-carbonyl; or cyano-$C_{1-3}$ alkyl-carbonyl; or benzyl-carbonyl; or phenoxy-methyl-carbonyl; or cyclohexyl-carbonyl; or $C_{1-3}$ alkoxy-carbonyl; or phenyl-carbonyl; or chloro-phenyl-carbonyl; or $C_{1-3}$ alkyl-phenyl-carbonyl; or $C_{1-3}$ alkoxy-phenyl-carbonyl; or nitro-phenyl-carbonyl; or furyl-carbonyl; or pyridyl-carbonyl; or $C_{1-3}$ alkyl-phenyl-sulfonyl; $R_2$ and $R_3$ when taken together form $C_{1-3}$ alkylidene; or benzylidene; $R_2$ and $R_3$ when taken together with the adjacent N-atom form piperidino; or morpholino; and $R_4$ is hydrogen; or $C_{1-3}$ alkyl; or chloro; such salts including the corresponding hydrogen chloride and methyl-sulfuric acid salts.

In particular, X is a direct bond; or the —NH—CS-group; $R_1$ is hydrogen; or $C_{1-3}$ alkyl; or hydroxy-$C_{1-3}$ alkyl; $R_2$ and $R_3$ each individually is hydrogen; or $C_{1-4}$ alkyl; or chloro-$C_{1-3}$ alkyl; $R_2$ and $R_3$ when taken together form $C_{1-3}$ alkylidene; $R_2$ and $R_3$ when taken together with the adjacent N-atom form piperidino; or morpholino; and $R_4$ is hydrogen; or $C_{1-3}$ alkyl; or chloro; such salts including the corresponding hydrogen chloride and methyl-sulfuric acid salts.

It will be realized that the instant compounds can be used as free bases or as salts of inorganic acids, such as hydrochloric acid, methylsulfuric acid, sulfuric acid and phosphoric acid, or organic acids, such as acetic acid, chloroacetic acid or toluenesulfonic acid; and the like. In connection with the salts, of course, it is the acridine compound moiety, not the acid, which determines the pesticidal effectiveness.

Advantageously, the active compounds according to the present invention exhibit strong insecticidal and acaricidal effects, yet possess low phytotoxicity. The effects set in rapidly and are long-lasting. The instant active compounds can therefore be used with markedly good results for the control of noxious sucking and biting insects, Diptera and mites (Acarina).

To the sucking insects contemplated herein there belong, in the main, aphids, such as the green peach aphid (*Myzus persicae*), the bean aphid (*Doralis fabae*); scales, such as *Aspidiotus hederae, Lecanium hesperidum, Pseudococcus maritimus;* Thysanoptera, such as *Hercinothrips femoralis;* and bugs, such as the beet bug (*Piesma quadrata*) and the bed bug (*Cimex lectularius*); and the like.

With the biting insects contemplated herein, there are classed, in the main, butterfly caterpillars, such as *Plutella maculipennis, Lymantria dispar*; beetles, such as granary weevils (*Sitophilus granarius*), the Colorado beetle (*Leptinotarsa decemlineata*), but also species living in the soil, such as the wireworms (Agriotes sp.) and larvae of the cockchafer (*Melolontha melolontha*); cockroaches, such as the German cockroach (*Blattella germanica*); Orthoptera, such as the house cricket (*Gryllus domesticus*); termites, such as Reticulitermes; Hymenoptera, such as ants; and the like.

The Diptera contemplated herein comprise, in particular, the flies, such as the vinegar fly (*Drosophila melanogaster*), the Mediterranean fruit fly (*Ceratitis capitata*), the house fly (*Musca domestica*), and mosquitoes, such as the yellow fever mosquito (*Aedes aegypti*); and the like.

In the case of the mites contemplated herein, particularly important are the spider mites (*Tetranychidae*) such as the two-spotted spider mite (*Tetranychus urticae*), the European red mite (*Panonychus ulmi*); gall mites, such as the currant gall mite (*Eriophyes ribis*) and tarsonemids, such as *Tarsonemus pallidus,* and ticks (Ixodidae), such as the Australian and South American cattle tick (*Boophilus microplus*); and the like.

Significantly, the active compounds according to the invention also exhibit rodenticidal properties and are therefore suitable for the control of leporine animals (Lagomorpha) and rodents (Rodentia), such as squirrel-like animals (Sciuroidae), gophers (Geomyoidae) and mouse-like animals (Muroidae) with which there are classed essentially the dormouse-like animals (Muscardinidae) and the mice (Muridae); and the like.

The leporine animals contemplated herein, include essentially the Leporidae, such as the rabbit (*Oryctolagus cuniculus*), the squirrel-like animals, for example the European souslik (*Citellus citellus*), and the ground squirrel (*Citellus lateralis*), and the gophers include for example the mountain pocket gopher (*Thomomys talpoides*); and the like.

With the dormouse-like animals contemplated herein, are classed for example the fat dormouse (*Glis glis*); and the like.

In the case of the mice contemplated herein, there are included, for example, in the group of the long-tailed mice (Murinae) the rats (Rattus spec.), such as the black rat (*Rattus rattus*) and the Norway rat (*Rattus norvegicus*); the house mice (Mus spec.), such as *Mus musculus*; in the group of the hamster-like animals (Cricetinae) the European hamster (*Cricetus cricetus*) and in the group of the short-tailed mice (Microtinae) the common vole (*Microtus arvalis*), the field vole (*Microtus agrestis*) and the water vole (*Arvicola terrestris*); and the like.

The active compounds according to the instant invention can be utilized, if desired, in the form of the usual formulations or compositions with conventional inert (i.e. plant compatible or herbicidally inert) pesticide diluents or extenders, i.e. diluents or extenders of the type usable in conventional pesticide formulations or compositions, e.g. conventional pesticide dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added, as auxiliary solvents. The following may be chiefly considered for use as conventional carrier vehicles for this purpose: inert dispersible liquid diluent carriers including inert organic solvents, such as aromatic hydrocarbons (e.g. benzene, toluene, xylene, etc.), halogenated, especially chlorinated, aromatic hydrocarbons (e.g. chloro-benzenes), paraffins (e.g. petroleum fractions), chlorinated aliphatic hydrocarbons (e.g. methylene chloride, etc.), alcohols, (e.g. methanol, ethanol, propanol, butanol, etc.), ethers, ether-alcohols (e.g. glyclol monomethyl ether, etc.), amines (e.g. ethanol-amine, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, alumina, silica, chalk, i.e. calcium carbonate, talc, kieselguhr, etc.), and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

As will be appreciated by the artisan, the active compounds according to the instant invention may be employed alone or in the form of mixtures with one another and/or with such solid and/or liquid dispersible carrier vehicles and/or with other known compatible active agents, especially plant protection agents, such as other insecticides, acaricides and rodenticides, or herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1 and 95% by weight, and preferably 0.5 and 90% by weight, of the mixture, whereas carrier composition mixtures suitable for direct application or field application generally contemplate those in which the active compound is present in an amount substantially between about 0.001–20%, preferably 0.005–5%, by weight of the mixture. Thus, the present invention contemplates overall compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.001–95%, and preferably 0.005–95%, by weight of the mixture.

The active compounds, for example, when used to control rodents and/or leporine animals, may be mixed with suitable carrier vehicles in the form of the usual bait materials of animal or vegetable origin, such as ground cereal products, meat meal, fish meal, and the like, as the artisan will appreciate.

In this regard, the concentration of the active compound in such bait can be substantially between about 0.005–5% by weight, if desired.

The active compounds can also be used in accordance with the well-known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. arthropods, i.e. insects and acarids, as well as rodents and leporine animals, and more particularly methods of combating at least one of insects, acarids, rodents, leporine animals, and the like, which comprise applying to at least one of correspondingly (a) such insects, (b) such acarids, (c) such rodents, (d) such leporine animals, and (e) the corresponding habitat thereof, i.e. the locus to be protected, a correspondingly combative or toxic amount, i.e. a pesticidally, such as arthropodicidally, especially insecticidally or acaricidally, and/or rodenticidally, effective amount, of the particular compound of the invention alone or together with a carrier vehicle (including a bait) as noted above. The instant formulations or compositions are applied in the usual manner, for example by spraying, atomizing, vaporizing, scattering, dusting, watering, sprinkling, squirting, fumigating in rooms and subterranean burrows, poisoning of drinking water, laying above ground and below ground food baits and play baits into which the active compound is incorporated, and the like.

It will be realized, of course, that the concentration of the particular active compound utilized, alone or in admixture with the carrier vehicle (including a bait), will depend upon the intended application, as the artisan will appreciate, and may be varied within a fairly wide range. Therefore, in special cases, it is possible to go above or below the aforementioned concentration ranges.

The arthropodicidal and rodenticidal activity of the particular active compounds according to the present invention are illustrated, without limitation, by the following examples:

EXAMPLE 1

Plutella test

Solvent: 3 parts by weight dimethyl formamide
Emulsifier: 1 part by weight alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Cabbage leaves (*Brassica oleracea*) are sprayed with the preparation of the given active compound until dew moist and are then infested with caterpillars of the diamond-back moth (*Plutella maculipennis*).

After the specified period of time, the degree of destruction is determined as a percentage: 100% means that all the caterpillars are killed, whereas 0% means that none of the caterpillars are killed.

The particular active compounds tested, their concentrations, the evaluation time and the results obtained, can be seen from the following Table 1:

TABLE 1.—PLANT-DAMAGING INSECTS
[Plutella test]

| Active compound | Concentration of active compound in percent | Degree of destruction in percent after 3 days |
| --- | --- | --- |
| (A) 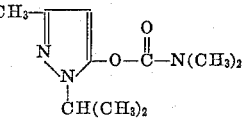 (Known) | 0.2 | 90 |
| (1₁) 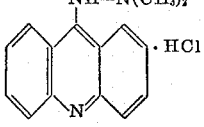 | 0.2<br>0.02 | 100<br>100 |
| (2₁) 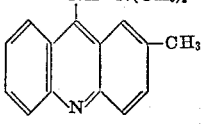 | 0.2<br>0.02 | 100<br>100 |
| (3₁) 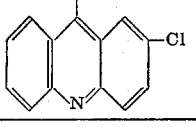 | 0.2<br>0.02 | 100<br>100 |

EXAMPLE 2

Tetranychus test

Solvent: 3 parts by weight dimethyl formamide
Emulsifier: 1 part by weight alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Bean plants (*Phaseolus vulgaris*), which have a height of approximately 10–30 cm., are sprayed with the preparation of the given active compound until dripping wet. These bean plants are heavily infested with spider mites (*Tetranychus urticae*) in all stages of development.

After the specified period of time, the effectiveness of the given active compound preparation is determined by counting the dead mites. The degree of destruction thus obtained is expressed as a percentage: 100% means that all the spider mites are killed, whereas 0% means that none of the spider mites are killed.

The particular active compounds tested, their concentrations, the evaluation time and the results obtained, can be seen from the following Table 2:

TABLE 2.—PLANT-DAMAGING MITES
[Tetranychus test]

| Active compound | Concentration of active compound in percent | Degree of destruction in percent after 48 hours |
| --- | --- | --- |
| (B) 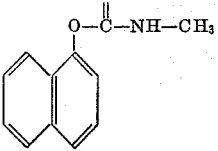 (Known) | 0.2 | 0 |
| (4₁) 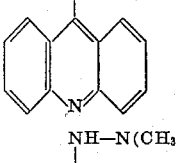 | 0.2<br>0.02 | 100<br>100 |
| (1₂) 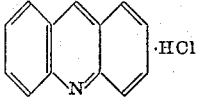 | 0.2<br>0.02 | 99<br>60 |
| (2₂) 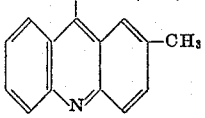 | 0.2<br>0.02 | 100<br>95 |
| (3₂) 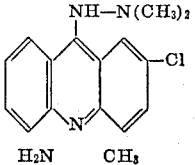 | 0.2<br>0.02<br>0.002 | 1.00<br>99<br>99 |
| (5₁) 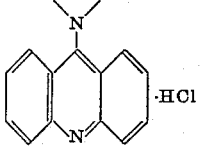 | 0.2<br>0.02 | 100<br>100 |
| (6₁) 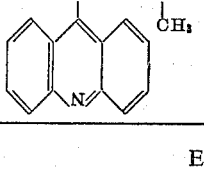 | 0.2 | 99 |

EXAMPLE 3

Food test/albino rat test animal: albino rat (*Rattus norvegicus*)

To produce a suitable preparation of the particular active compound, 3 parts by weight of such active compound are mixed with 2.8 parts by weight of highly dispersed silicic acid and 4.2 parts by weight of talc. This concentrate containing 30 percent by weight of the given active compound is extended with a powdered, commercially-available standard rat diet to the desired final concentration of active compound in each case.

In each case, 50 grams of the positioned bait thus prepared are placed in an automatic feeding device and put before albino rats which are kept separately from one another. No untreated food is available to the animals but they receive water freely. The restriction test proceeds for 72 hours; whereas the ensuing observation period, with normal feeding of untreated standard rat diet, is of 7 days, calculated from the end of the restriction test. The mortality observed in this test is a valid measure of the rodenticidal effectiveness of the given active compound.

Taking into account the previously determined $LD_{100}$ value (dose of active compound with which 100% of the treated rats are killed), the given active compound dosage is so effected that there is contained in 4 grams of bait the amount of poison certain to be lethal to a rat weighing 200 grams. In this way, adaptation is made to the natural feeding behavior of the rats.

The particular active compounds tested, their $LD_{100}$ values, their concentration in the bait, and the kill attained, can be seen from the following Table 3.

TABLE 3.—FOOD TEST/ALBINO RAT

| Active compound | $LD_{100}$, mg./kg, (rat) | Concentration of active compound in bait in percent | Number of rats, dead/used |
|---|---|---|---|
| (C) Zinc phosphide (known) | 75 | 0.375 | 0/2 |
| (D) Alpha naphthyl thiourea (known) | 10 | 0.05 | 0/2 |
| (E) 5-(α-hydroxy-α-pyrid-2'-yl-benzyl)-7-(α-pyrid-2''-yl-benzylidene)-5-norbornene-2,3-dicarboximide (known) | 30 | 0.15 | 0/2 |
| ($4_2$) acridine-NH.N(CH$_3$)$_2$ | 2.5 | 0.0125 | 4/4 |
| ($1_3$) acridine-NH.N(CH$_3$)$_2$ · HCl | 5 | 0.025 | 4/4 |
| ($7_1$) acridine-NH.N(CH$_3$)$_2$ · CH$_3$O.SO$_3$H | 5 | 0.025 | 4/4 |
| ($3_2$) acridine-NH.N(CH$_3$)$_2$ | 5 | 0.025 | 1/2 |
| ($8_1$) acridine-NH.N(CH$_2$.CH$_2$Cl)$_2$ · HCl | 10 | 0.05 | 4/4 |
| ($9_1$) acridine-NH.N(CH$_2$.CH$_2$.CH$_2$.CH$_2$)$_2$ · HCl | 25 | 0.125 | 1/2 |
| ($10_1$) acridine-NH—N(piperidine) | 5 | 0.025 | 4/4 |
| ($11_1$) acridine-NH—N(morpholine) | 10 | 0.05 | 4/4 |
| ($12_1$) acridine-NH.N(morpholine) · CH$_3$.O.SO$_3$H | 20 | 0.1 | 4/4 |

TABLE 3.—FOOD TEST/ALBINO RAT—Continued

| Active compound | LD₁₀₀, mg./kg. (rat) | Concentration of active compound in bait in percent | Number of rats, dead/used |
|---|---|---|---|
| (5₁) H₃C.N.NH₂ (acridine·HCl) | 5 | 0.025 | 4/4 |
| (13₁) NH.CS.NH.NH₂ (acridine) | 50 | 0.25 | 4/4 |
| (6₂) NH.CS.N.NH₂ / CH₃ (acridine) | 5 | 0.025 | 4/4 |
| (14₁) NH.CS.N.N=CH.CH₃ / CH₃ (acridine) | 20 | 0.1 | 1/2 |
| (15₁) NH.CS.N.N=C(CH₃)₂ / CH₃ (acridine) | 20 | 0.1 | 4/4 |
| (16₁) HO.CH₂.CH₂—N—NH₂ (acridine·HCl) | 10 | 0.05 | 4/4 |

The following further examples illustrate, without limitation, the manner of producing the particular active compounds usable according to the present invention.

EXAMPLE 4

(5₃) 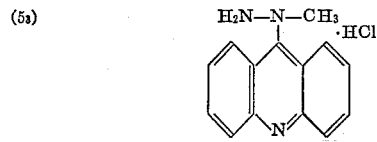

0.1 mole (21.4 g.) 9-chloro-acridine is dissolved with heating to 100° C., in 80 g. phenol, and 0.1 mol (4.6 g.) monomethyl-hydrazine are added thereto dropwise, with stirring. Heating to 100° C. is effected for one hour, followed by cooling, and the hydrochloride which forms is precipitated with ether. After recrystallization from methanol, 18 g. (70% of the theory) of 9-(1-methyl-hydrazino)-acridine hydrochloride are obtained in the form of yellow crystals, M.P. 227° C. (decmp.).

EXAMPLE 5

(17₁) 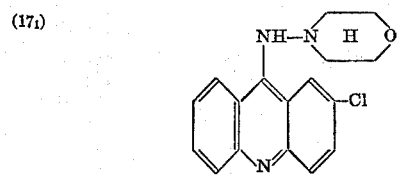

0.05 mol (12.4 g.) of 2,9-dichloro-acridine is heated in 40 g. phenol with 0.05 mol (5.1 g.) N-amino-morpholine to 100° C. for 1 hour. After cooling, the hydrochloride which forms is precipitated with ether. The hydrochloride is then suspended hot in 100 ml. ethanol, and the free base is liberated by dropwise addition of concentrated ammonia solution and water. After cooling, the free base is filtered off with suction and recrystallized from benzene. 12 g. (76% of the theory) of 2-chloro-9-(N-amino-morpholino)-acridine are obtained, M.P. 224–226° C.

EXAMPLE 6

(6₁) 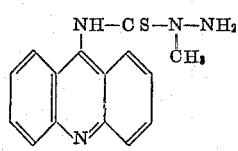

0.06 mol (2.7 g.) monomethyl-hydrazine are added at 50° C. to a solution of 0.05 mol (11.8 g.) acridin-9-yl-isothiocyanate in 120 ml. benzene. After subsidence of the exotheral reaction, stirring is continued for some time at room temperature. The product precipitates, is filtered off with suction and washed with benzene. 12 g. (85% of the theory) of 1-acridin-9'-yl)-3-methyl - thiosemicarbazide are obtained, M.P. 198° C. (decomp.) (recrystallized from isobutanol).

In analogous manner the following compounds of Formula Ia above are also prepared:

TABLE 4

| | | M.P., °C. |
|---|---|---|
| (4₃) | NH—N(CH₃)₂ | 158–160 |
| (11₂) | HN—N◯H O | ¹ 243 |
| (13₂) | NH—CS—NH—NH₂ | ¹ 214 |
| (7₂) | NH—N(CH₃)₂ · CH₃O—SO₃H | 169–170 |
| (12₂) | NH—N◯H O · CH₃O—SO₃H | 228–230 |
| (1₄) | NH—N(CH₃)₂ · HCl | ¹ 242 |
| (8₂) | NH—N(CH₂CH₂Cl)₂ · HCl | ¹ 252 |
| (10₂) | NH—N◯H | 188–189 |
| (2₃) | NH—N(CH₃)₂, —CH₃ | 185–186 |
| (3₄) | NH—N(CH₃)₂, —Cl | 157–158 |
| (15₂) | NH·CS·N·N=C(CH₃)₂, CH₃ | ¹ 180 |

TABLE 4—Continued

| | | M.P., °C. |
|---|---|---|
| (18₁) | NH·NH₂ | 168–169 |
| (9₂) | NH·N(CH₂·CH₂·CH₂·CH₂)₂ · HCl | 184–185 |
| (19₁) | NH—NH—COOC₂H₅ · HCl | ¹ 249 |
| (20₁) | NH—NH—CO—◯ | ¹ 240–242 |
| (21₁) | NH—NH—CO—CH₃ | ¹ 253 |
| (22₁) | NH—NH—COCH₂CN | ¹ 328–330 |
| (16₂) | N(CH₂—CH₂OH)(NH₂) · HCl | ¹ 195–197 |
| (14₂) | NH—CS—N(CH₃)(N=CHCH₃) | 158 |
| (23₁) | NH—NH—CO—◯O | 274 |
| (24₁) | NH—NH—CO—◯—OCH₃ | ¹ 277 |
| (25₁) | NH—NH—CO—◯(OCH₃) | ¹ 286 |

TABLE 4—Continued

| | M.P., °C. |
|---|---|
| (26₁) NH—NH—CO—C₆H₄—NO₂ (acridine) | ¹310 |
| (27₁) NH—NH—CO—C₆H₄—H (acridine) | 198-199 |
| (28₁) NH—NH—CO—(CH₂)₁₆—CH₃ (acridine) | 116-118 |
| (29₁) NH—NH—SO₂—C₆H₄—CH₃ (acridine) | ¹161 |
| (30₁) NH—NH—CO—CH₂—C₆H₅ (acridine) | ¹227-228 |
| (31₁) NH—NH—CO—C₆H₄—Cl (acridine) | ¹282 |
| (32₁) NH—NH—CO—C₆H₄—CH₃ (acridine) | 226-227 |
| (33₁) NH—NH—CO—CH₂O—C₆H₅ (acridine) | 217-219 |
| (34₁) NH—NH—CO—pyridyl (acridine) | ¹287-292 |
| (35₁) NH—NH—CO—C(CH₃)₃ (acridine) | 201-203 |
| (36₁) NH—N=C(CH₃)₂ (acridine) | 145-146 |
| (37₁) NH—N=CH—C₆H₅ (acridine) | 112-114 |
| (38₁) NH—N=CH—CH₃ (acridine) | 145-146 |

¹ Decomposition.

Certain typical compounds usable according to the present invention may be designated:

(1) 9-(2',2'-dimethyl-hydrazino)-acridine hydrochloride
(2) 2-methyl-9-(2',2'-dimethyl-hydrazino)-acridine
(3) 2-chloro-9-(2',2'-dimethyl-hydrazino)-acridine
(8) 9-(2',2'-bis-β-chloro-ethyl-hydrazino)-acridine hydrochloride
(14) 9-(3'-methyl-4'-ethylidene-thiosemicarbazido)-acridine It will be realized that all of the foregoing compounds contemplated by the present invention possess the desired selective pesticidal, especially arthropodicidal, i.e. insecticidal or acaricidal, as well as rodenticidal, properties for combating insects, acarids, rodents and leporine animals and that such compounds have a low phytotoxicity.

As may be used herein, the terms "arthropod," "arthropodicidal" and "arthropodicide" contemplate specifically both insects and acarids. Thus, the insects and acarids may be considered herein collectively as arthropods to be combated in accordance with the invention, and accordingly the insecticidal and/or arcaricidal activity may be termed arthropodicidal activity, and the concomitant combative or effective amount used will be an arthropodicidally effective amount which in effect means an insecticidally or acaricidally effective amount of the active compound for the desired purposes.

It will be appreciated that the instant specification and examples are set forth by way of illustration and not limitation, and that various modifications and changes may be made without departing from the spirit and scope of the present invention which is to be limited only by the scope of the appended claims.

What is claimed is:
1. An insecticidal, acaricidal and rodenticidal composition which consists essentially of a mixture of a dispersible carrier vehicle selected from the group consisting of (1) a finely divided dispersible carrier solid containing a surface-active agent selected from the group consisting of non-ionic emulsifying agents, anionic emulsifying agents, and dispersing agents, and (2) a dispersible carrier liquid selected from the group consisting of inert organic solvents, water, and mixtures thereof, and containing a surface-active agent selected from the group consisting of non-ionic emulsifying agents, anionic emulsifying agents and dispersing agents, and a pesticidally effective amount, constituting substantially between about 0.001-95% by weight of the mixture, of a compound selected from the group consisting of
a 9-substituted-acridine of the formula

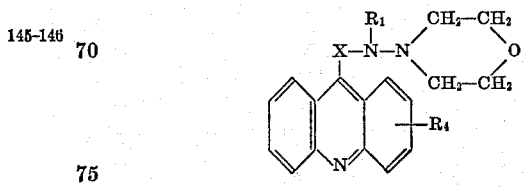

in which X is selected from the group consisting of a direct bond and the —NH—CS— group, $R_1$ is selected from the group consisting of hydrogen, alkyl of 1–4 carbon atoms and hydroxyalkyl of 1–4 carbon atoms.

$R_4$ is selected from the group consisting of hydrogen, alkyl of 1–4 carbon atoms and chloro; and the corresponding salts thereof selected from the group consisting of the hydrogen chloride salts and the alkyl-sulfuric acid salts having 1–4 carbon atoms in the alkyl moiety.

2. A method of controlling pests selected from the group consisting of insects, acarids, leporine animals and rodents, which comprises applying to at least one of (a) such pests and (b) their habitat, a pesticidally effective amount of a compound selected from the group consisting of a 9-substituted-acridine of the formula

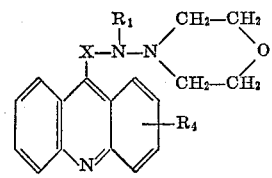

in which X is selected from the group consisting of a direct bond and the —NH—CS— group, $R_1$ is selected from the group consisting of hydrogen, alkyl of 1–4 carbon atoms and hydroxyalkyl of 1–4 carbon atoms, $R_4$ is selected from the group consisting of hydrogen, alkyl of 1–4 carbon atoms and chloro; and the corresponding salts thereof selected from the group consisting of the hydrogen chloride salts and the alkyl-sulfuric acid salts having 1–4 carbon atoms in the alkyl moiety.

3. The method according to claim 2 wherein X is selected from the group consisting of a direct bond and the —NH—CS-group, $R_1$ is selected from the group consisting of hydrogen, $C_{1-3}$ alkyl and hydroxy-$C_{1-3}$ alkyl, $R_4$ is selected from the group consisting of hydrogen, $C_{1-3}$ alkyl and chloro; and the corresponding salts are selected from the group consisting of the hydrogen chloride and methyl-sulfuric acid salts.

4. The method according to claim 2 wherein such compound is used in the form of a mixture with a dispersible carrier vehicle, said compound being present in a pesticidally effective amount and constituting substantially between about 0.001–95% by weight of the mixture.

5. The method according to claim 2 for controlling arthropods which comprises applying to at least one of (a) such arthropods and (b) their habitat, an arthropodicidally effective amount of such compound according to claim 2.

6. The method according to claim 2 for controlling a pest selected from the group consisting of leporine animals and rodents which comprises applying to at least one of (a) such leporine animals, (b) such rodents, and (c) the corresponding habitat thereof, a pesticidally effective amount of such compound according to claim 2.

7. The method according to claim 6 wherein such compound is used in the form of a mixture with a bait, said compound being present in a rodenticidally effective amount and constituting substantially between about 0.005–5% by weight of the mixture.

8. The method according to claim 2, wherein such compound is 9-N-morpholino-amino-acridine of the formula:

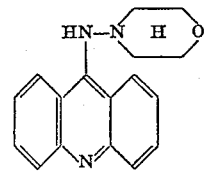

243° C. (decomp.)

References Cited

Chemical Abstracts, vol. 62 (1965), p. 517(e).

J. Chem. Soc. (1965), p. 4653 (Albert).

ALBERT T. MEYERS, Primary Examiner

V. D. TURNER, Assistant Examiner

U.S. Cl. X.R.

424—248, 257